(12) United States Patent
Luo et al.

(10) Patent No.: US 10,484,690 B2
(45) Date of Patent: Nov. 19, 2019

(54) ADAPTIVE BATCH ENCODING FOR SLOW MOTION VIDEO RECORDING

(71) Applicant: INTEL CORPORATION, Santa Clara, CA (US)

(72) Inventors: Ning Luo, Shanghai (CN); Changliang Wang, Bellevue, WA (US); Bo Zhao, Shanghai (CN); Yue Xiong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 25 days.

(21) Appl. No.: 15/570,575

(22) PCT Filed: Jun. 4, 2015

(86) PCT No.: PCT/CN2015/080772
§ 371 (c)(1),
(2) Date: Oct. 30, 2017

(87) PCT Pub. No.: WO2016/192079
PCT Pub. Date: Dec. 8, 2016

(65) Prior Publication Data
US 2018/0131941 A1   May 10, 2018

(51) Int. Cl.
*H04N 19/156* (2014.01)
*H04N 19/127* (2014.01)
*H04N 19/177* (2014.01)

(52) U.S. Cl.
CPC ......... *H04N 19/156* (2014.11); *H04N 19/127* (2014.11); *H04N 19/177* (2014.11)

(58) Field of Classification Search
CPC .... H04N 7/12; H04N 19/156; H04N 5/23245; H04N 5/2621; H04N 5/772; H04N 9/79;
(Continued)

(56) References Cited

U.S. PATENT DOCUMENTS

| 5,937,138 A | 8/1999 | Fukuda et al. |
| 6,543,053 B1 * | 4/2003 | Li ................... H04N 7/17318 |
|  |  | 348/E7.071 |

(Continued)

FOREIGN PATENT DOCUMENTS

| CN | 1197575 | 10/1998 |
| CN | 101179727 | 5/2008 |

(Continued)

OTHER PUBLICATIONS

International Search Report & Written Opinion, dated Mar. 1, 2106, for PCT Patent Application No. PCT/CN15/80772.
(Continued)

*Primary Examiner* — Dramos Kalapodas
(74) *Attorney, Agent, or Firm* — Green, Howard & Mughal LLP.

(57) ABSTRACT

Techniques related to compositing video content are discussed. Such techniques may include generating transparency data for a surface of first video content and storing it in a stream out buffer, accessing the transparency data via the stream out buffer when there is no change to the surface of the first video content, and compositing the first video content with second video content based on the accessed transparency data.

22 Claims, 6 Drawing Sheets

(58) Field of Classification Search
CPC .... H04N 9/8042; H04N 5/907; H04N 19/105; H04N 19/157; H04N 19/172; H04N 19/42
See application file for complete search history.

(56) References Cited

U.S. PATENT DOCUMENTS

| | | | | |
|---|---|---|---|---|
| 8,230,343 | B2* | 7/2012 | Logan | G10H 1/0033 715/723 |
| 2002/0114330 | A1* | 8/2002 | Cheung | H04N 7/17336 370/390 |
| 2004/0158878 | A1* | 8/2004 | Ratnakar | H04N 21/41407 725/150 |
| 2013/0057563 | A1 | 3/2013 | Persson | |
| 2013/0170762 | A1 | 7/2013 | Marti et al. | |
| 2013/0188723 | A1 | 7/2013 | Tanaka et al. | |
| 2013/0188921 | A1 | 7/2013 | Kuriyama | |
| 2013/0335443 | A1 | 12/2013 | Harper et al. | |
| 2014/0010282 | A1* | 1/2014 | He | H04N 21/23439 375/240.02 |
| 2014/0355948 | A1* | 12/2014 | Kosakai | H04N 5/232 386/224 |
| 2018/0007355 | A1* | 1/2018 | Borel | H04N 19/103 |
| 2019/0082108 | A1* | 3/2019 | Kinoshita | H04N 5/232 |

FOREIGN PATENT DOCUMENTS

| | | | |
|---|---|---|---|
| CN | 101179727 A * | 5/2008 | .......... H04N 19/105 |
| CN | 105224410 | 1/2010 | |
| CN | 102263889 | 11/2011 | |
| CN | 102263889 A * | 11/2011 | ......... H04N 5/23245 |
| CN | 102859492 | 1/2013 | |
| CN | 103125119 | 5/2013 | |
| JP | 2000350043 | 12/2000 | |
| WO | 2015123840 | 8/2015 | |

OTHER PUBLICATIONS

International Search Report and Written Opinion for International Patent Application No. PCT/CN2016/074373, dated Nov. 21, 2016.
International Preliminary Report on Patentability dated Dec. 14, 2017 for International Patent Application No. PCT/CN2015/080772.

* cited by examiner

ADAPTIVE BATCH ENCODING FOR SLOW MOTION VIDEO RECORDING

CLAIM OF PRIORITY

This Application is a National Stage Entry of, and claims priority to, PCT Application No. PCT/CN2015/080772, filed on 4 Jun. 2015 and titled "ADAPTIVE BATCH ENCODING FOR SLOW MOTION VIDEO RECORDING", which is incorporated by reference in its entirety for all purposes.

BACKGROUND

In some video recording contexts, a video recording device (e.g., a video camera or other device including video recording capabilities such as a smartphone, tablet, or other device) may record video in slow motion (e.g., for slow motion playback). For example, such slow motion video recording capabilities may be becoming more common in mobile devices. In some slow motion video recording implementations, slow motion camera recording may operate at moderate resolution (e.g., not the full resolution of the image sensor) and at a higher frame capture rate (e.g., as compared with standard video recording). For example, some slow motion video recording may be performed at 720P at 120 fps (frames per second), or 720 at 240 fps, or the like.

While some processors implemented via such video recording devices may be able to handle such slow motion video recording in real time, power consumption remains a concern in such devices as battery life is a primary performance metric for consumers. Current techniques for mitigating such power consumption problems include reducing the frames per second of the slow motion video recording and/or time stretching based on post production frame rate conversion (e.g., inserting newly generated frames). However, such techniques may provide lower quality video for slow motion playback as reducing the frames per second reduce the amount of frames attained and thereby limit how slowly the playback may be provided and time stretching by inserting newly generated frames may introduce undesirable artifacts and the like.

It may be advantageous to perform high quality slow motion video recording with low power usage and thereby extend device battery life. It is with respect to these and other considerations that the present improvements have been needed. Such improvements may become critical as the desire to record high quality slow motion video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
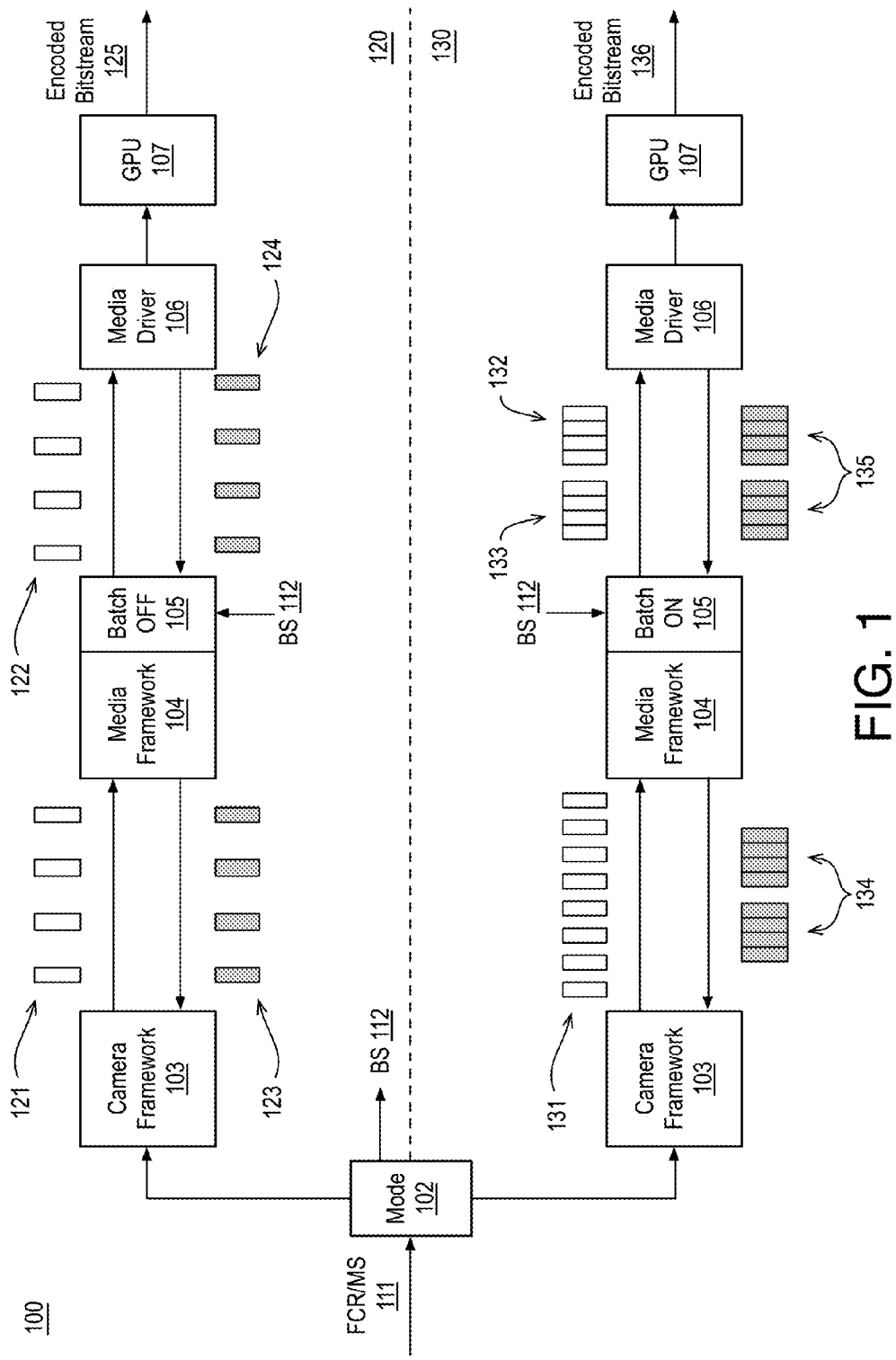
FIG. 1 illustrates an example video pipeline for adaptively batching encode tasks for slow motion video recording.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "implementation(s)", "example(s)", "embodiment(s)", etc., indicate that the implementation, example, or embodiment described may include a particular feature, structure, characteristic, or the like, but every implementation, example, or embodiment may not necessarily include the particular feature, structure, or characteristic. Moreover, such phrases are not necessarily referring to the same implementation, example, or embodiment. Further, when a particular feature, structure, or characteristic is described in connection with an implementation, example, or embodiment, it is submitted that it is within the knowledge of one skilled in the art to affect such feature, structure, or characteristic in connection with other implementations, examples, or embodiments whether or not explicitly described herein.

Methods, devices, apparatuses, computing platforms, and articles are described herein related to slow motion video recording and, in particular, to adaptively batching encode tasks in slow motion video recording.

As described above, slow motion video recording (e.g., recording video for slow motion playback) may be performed by recording at higher frame rates such as at 120 fps or 240 fps or the like as compared to 30 fps or 60 fps or the like for recording for standard playback. In some examples, the slow motion video recording may also be performed at lower resolution (e.g., at 720P or the like) as compared to the full resolution available via the image sensor of the video recording device. Furthermore, it may be desirable to perform such slow motion video recording in real time, with high quality and low power usage.

For example, in slow motion video recording, high speed processing may be performed for a recording stream (e.g., an encoding task) while a preview stream (e.g., presented to a user in real time via a display) may be processed at a common speed. From a power usage perspective such high speed processing may be detrimental such that such processing may impact the power performance activity of the device. For example without the techniques discussed herein, in a 720P camera recording example, a graphics processing unit (GPU) and a central processing unit (CPU) may be woken up for every input frame. In examples where the processing of a frame takes about 3 milliseconds (ms), at 120 fps capture, the wake up cycle may be about 8.3 ms such that GPU and CPU are awoken frequently and do not have the opportunity to enter deeper sleep states during operation. Furthermore, each encoding task may generate 2 or 3 interrupts such that, continuing the 120 fps example, 240 to 360 interrupts may be generated per second. Such interrupts may constantly wake the CPU and/or GPU.

In some embodiments discussed herein, a video recording device (e.g., a camera, video camera, or a device including a video recording capability such as a smart phone, tablet, laptop, or the like) may enter a slow motion video recording mode based on a slow motion video recording signal from a user interaction or an application or the like running on the device, a requested frame capture rate being greater than or equal to a threshold (e.g., 120 fps), or the like. In such a slow motion video recording mode, multiple video frames may be buffered to generate an encode batch including the video frames. The encode batch may include a batch size (e.g., the batch size determining the number of video frames in the encode batch) such as four video frames or the like. The encode batch may be encoded via an encoder (e.g., implemented via graphics processor or the like) during a continuous active state (e.g., without entering a sleep state) to generate an encoded bitstream. The encoded bitstream may be saved (e.g., via a container), transmitted to a remote device for storage or display, or the like.

In slow motion video recording contexts, such adaptive batching (e.g., adaptive batch scheduling) for encoding or encode tasks may provide substantial power savings. For example, a processor (e.g., a graphics processor) implementing the encoder may enter a low power state during the times between such batch encoding. For example, upon completion of a first encode batch, the processor implementing the encoder may enter a low power state, a sleep state, or the like. The processor implementing the encoder may stay in such a sleep state until a second encode batch is provided. In contrast to providing each frame for encoding without batching, such encode batches may provide for longer low power or sleep durations (e.g., between batches), which may be advantageous. Furthermore, such extended low power or sleep durations may allow the processor implementing the encoder to enter deeper low power or sleep states during such durations. For example, in contrast to intermittent opportunities to enter a low power or sleep state during encoding in a frame-wise manner, encode batching as discussed herein may provide extended breaks between encode tasks such that the processor implementing the encoder may enter deeper low power or sleep states. The techniques discussed herein may thereby decrease a wake up frequency of a graphics processor and/or a central processor in slow motion recording contexts. Such techniques may thereby save substantial power for the video recording device during slow motion video recording. Although discussed herein with respect to slow motion recording, the discussed techniques may be used in any high speed recording context.

FIG. 1 illustrates an example video pipeline 100 for adaptively batching encode tasks for slow motion video recording, arranged in accordance with at least some implementations of the present disclosure. As shown in FIG. 1, video pipeline 100 may include a mode module 102, a camera framework 103, a media framework 104, a frame batching module 105, a media driver 106, and a graphics processor (GPU) 107. In some examples, mode module 102, camera framework 103, media framework 104, frame batching module 105, media driver 106, or portions thereof may be implemented via a central processor or central processing unit or the like. Furthermore, GPU 107 may implement an encoder to perform encode tasks (please refer to FIG. 5). In some examples, the central processing unit, GPU 107, and a memory to implement a buffer may be implemented as system on-chip (SoC) device.

As shown, video pipeline 100 may generate, via camera framework 103, input video frames 121 and/or input video frames (input frames) 131 for processing. For example, video frames 121 and video frames 131 may generated via any suitable module or hardware or the like such as a camera module, image preprocessing modules, or the like, which may implement camera framework 103. Furthermore, video frames 121 and video frames 131 may include any suitable image or video data. For example, video frames 121 and video frames 131 may include YUV (e.g., luma-chrominance-chrominance) data or data in any suitable color space such as the red-green-blue (RGB) color space or the like. For example, such YUV data may include three channels of data with a Y value, a U value, and V value for each pixel of the associated video frame of video frames 121 and video frames 131. As discussed, in some examples, video frames 121 and video frames 131 may be preprocessed via an image or video processor of the camera module, a central processor, a graphics processor, or the like. In some examples, video frames 121 and video frames 131 may be preprocessed via a hardware abstraction layer implemented via GPU 107 and/or a central processor or the like. For example, camera framework 103 may be implemented via one or more of a camera module, an image preprocessor, GPU 107, and a central processor.

Furthermore, video pipeline may provide an encoded bitstream 125 and/or an encoded bitstream 136. Encoded bitstream 125 and encoded bitstream 136 may include any suitable bitstream data encoded via any suitable encoding standard, encoding techniques, or the like. For example, encoded bitstream 125 and encoded bitstream 136 may be H.264 advanced video coding compliant bitstreams, H.265 high efficiency video coding compliant bitstreams, or the like. Encoded bitstream 125 and encoded bitstream 136 may be further processed using any suitable technique or techniques. For example, encoded bitstream 125 and encoded bitstream 136 may be provided to media driver 106 and/or media framework 104 where they may be combined with encoded audio to generate packetized elementary streams or the like. Furthermore, encoded bitstream 125 and encoded bitstream 136 may be saved to a local memory, provided to a local or remote display for presentment, transmitted to a remote device for storage or display, or the like.

Video pipeline 100 may be implemented via any suitable device such as, for example, a personal computer, a laptop computer, a tablet, a phablet, a smart phone, a digital camera, a gaming console, a wearable device, a display device, an all-in-one device, a two-in-one device, or the like or platform such as a mobile platform or the like. For example, as used herein, a system, device, computer, or computing device may include any such device or platform. Furthermore, video pipeline 100 may be implemented or utilized in a variety of contexts such as a standard video recording context via standard video processing mode 120, a slow motion video recording context via slow motion video processing mode 130, or a standard video presentment and slow motion video recording context implemented via a standard video presentment (not shown) and slow motion video processing mode 130 (e.g., for slow motion recording). Furthermore, in some contexts, slow motion video processing mode 130 may be characterized as a slow motion mode, a slow motion video recording mode, or the like.

As shown, video pipeline 100 may generate video frames 121 or video frames 131 depending on a selected mode of operation between standard video processing mode 120 or slow motion video processing mode 130. For example, mode module 102 may receive a frame capture rate/mode signal (FCR/MS) 111. For example, FCR/MS 111 may include requested frame capture rate (e.g., received based on a user input or from an application or the like), a requested mode signal (e.g., received based on a user input or from an application or the like), or the like.

For example, in the context of a requested frame capture rate, mode module 102 may receive the requested frame capture rate and compare it to a threshold frame capture rate to determine whether video frames are to be processed via standard video processing mode 120 or slow motion video processing mode 130. The received requested frame capture rate may be any suitable frame capture rate such as 30 fps, 60 fps, 120 fps, 240 fps, or the like. Furthermore, the threshold frame capture rate may be a predetermined threshold, a user provided threshold, a system determined threshold or the like. The threshold frame capture rate may define, based on the received requested frame capture rate, whether video pipeline 100 implements standard video processing mode 120 or slow motion video processing mode 130. For example, the threshold frame capture rate may be 120 fps such that if a requested frame capture rate is less than 120 fps, video pipeline 100 implements standard video processing mode 120 and, if a requested frame capture rate is 120 fps or more (e.g., not less than 120 fps), video pipeline 100 implements slow motion video processing mode 130.

In the context of a requested mode signal received via FCR/MS 111, mode module 102 may implement standard video processing mode 120 or slow motion video processing mode 130 based on the received signal or indicator (e.g., indicating standard mode or a slow motion mode). As shown, mode module 102 may provide a batch signal (BS) 112 to frame batching module 105 based on the mode of operation. As shown, in standard video processing mode 120, BS 112 may turn off frame batching module 105 such that no frame batching is performed (e.g., a batch size of 1 is implemented). In slow motion video processing mode 130, BS 112 may turn ON frame batching module 105. Furthermore, in slow motion video processing mode 130, BS 112 may provide a batch size for batching frames for encoding. For example, the batch size may indicate the number of frames to be included in each batch of video frames. The batch size may be any suitable batch size such as two frames, three frames, four frames, or more.

As shown, in standard video processing mode 120, camera framework 103 may provide video frames 121 to media framework 104. In some examples, video frames 121 may be buffered in memory (e.g., via a ring buffer or the like) between processing via camera framework 103 and processing via media framework 104. For example, video frames 121 may be input to a frame buffer by camera framework 103 and retrieved from the frame buffer by media framework 104. As shown, when a frame or frames are retrieved and/or complete processing via media framework 104, media framework 104 may release surfaces 123 back to camera framework 103 for subsequent frames.

Video frames 121 may be video frames at any resolution (e.g., 720P) and any frame rate less than the frame rate threshold applied via mode module 102 (if applicable) such as 30 fps, 60 fps, or the like. Media framework 104 may receive video frames 121 and media framework may provide video frames 122 to media driver 106, which may provide such frames for encoding via GPU 107. For example, video frames 122 may be at a resolution and frame rate equal to the frame rate of video frames 121. For example, video frames 121 and video frames 122 may provide the same data content but the holders of such content may be different. For example, the holders of video frames 122 may be provided in a format suitable for submission to media driver 106 and encoding via GPU 107. In some examples, video frames 122 may be buffered in memory (e.g., via a ring buffer or the like) between processing via media framework 104 and processing via media driver 106. For example, video frames 122 may be input to a frame buffer by media framework 104 and retrieved from the frame buffer by media driver 106. As shown, when a frame or frames are retrieved and/or complete processing via media driver 106, media driver 106 may release surfaces 124 back to media framework 104 for subsequent frames.

GPU 107 may receive video frames 122 and any control signals for encoding via media driver 106 and GPU may encode video frames 122 to generate encoded bitstream 125. As discussed, encoded bitstream may be stored, transmitted, further processed, or the like. As shown, in standard video processing mode 120, no batching of frames may be performed (e.g., frame batching module 105 may be off, set a batch size to one, or the like).

In slow motion video processing mode 130, camera framework 103 may provide video frames 131 to media framework 104. As shown, video frames 131 may have a higher frame rate with respect to video frames 121. As discussed with respect to video frames 121, in some examples, video frames 131 may be buffered in memory (e.g., via a ring buffer or the like) between processing via camera framework 103 and processing via media framework 104. For example, video frames 131 may be input to a frame buffer by camera framework 103 and retrieved from the frame buffer by media framework 104. As shown, when a frame or frames are retrieved and/or complete processing via media framework 104, media framework 104 may release surfaces 134 back to camera framework 103 for subsequent frames. For example, surfaces 134 may be returned as batches after batch processing (e.g., as discussed further herein) is completed.

Video frames 131 may be video frames at any resolution (e.g., 720P) and any frame rate greater than or equal to the frame rate threshold applied via mode module 102 (if applicable) such as 120 fps, 240 fps, or the like. Media framework 104 may receive video frames 131 and media framework may provide batches of video frames 132, 133 to media driver 106. For example, frame batching module 105 may be implemented via media framework 104, as a plug-in to media framework 104, or as a separate module from media framework 104 to generate batches of video frames 132, 133 based on video frames 131. In some examples, batches of video frames 132, 133 may include multiple frames of frames 131 based on a batch size implemented via batch signal 122. In the illustrated example, the batch size is four frames. However, as discussed, any suitable batch size may be used.

As shown, media framework 104 and/or frame batching module 105 may provide batches of video frames 132, 133 for encoding via GPU 107. For example, the frames of batches of video frames 132, 133 may be at a resolution equal to the resolution of video frames 131 but the frame rate may be modified such that a number frames equaling the batch size are provided at a frame batch rate. In the illustrated example, encode batches of four frames may be provided at 30 frame batches per second (e.g., 4×720P at 30 batches per second). As discussed with respect to video frames 121, video frames 121 and the video frames of batches of video frames 132, 133 may provide the same data content but the holders of such content may be different. For example, the holders of the video frames of batches of video frames 132, 133 may be provided in a format suitable for submission to media driver 106 and encoding via GPU 107.

In some examples, batches of video frames 132, 133 may be buffered in memory (e.g., via a ring buffer or the like) between processing via media framework 104 and/or frame batching module 105 and processing via media driver 106. For example, batches of video frames 132, 133 may be input to a frame buffer by media framework 104 and/or frame batching module 105 and retrieved from the frame buffer by media driver 106. As shown, when a frame or frames are retrieved and/or complete processing via media driver 106, media driver 106 may release surfaces 135 back to media framework 104 and/or frame batching module 105 for subsequent frames. As shown, in some examples, surfaces 135 may be released in batches having the same number of surfaces as the number of frames in batches of video frames 132, 133. In other examples, surfaces 135 may be released on a per frame basis.

GPU 107 may receive batches of video frames 132, 133 and any control signals for encoding via media driver 106 and GPU 107 may encode batches of video frames 132, 133 to generate encoded bitstream 136. For example, GPU 107 may encode batch of video frames 132 during a continuous active state. GPU 107 may enter a sleep state upon completion of encoding batch of video frames 132 and GPU 107 may wake from the sleep state upon receiving batch of video frames 133. Furthermore, GPU 107 may enter a sleep state upon completion of encoding batch of video frames 133, and so on. In some examples, encoded bitstream 136 may be characterized as a slow motion video encoded bitstream, a high frame rate video encoded bitstream, or the like. As discussed, encoded bitstream may be stored, transmitted, further processed, or the like. Batches of video frames 132, 133 may be encoded using any suitable technique or techniques. As discussed each of batches of video frames 132, 133 may be encoded in a burst mode by batching the video frames and in a continuous active state of GPU 107. In some examples, batches of video frames 132, 133 may be encoded in serial (e.g., on a per frame basis). In other examples, two or more of batches of video frames 132, 133 may be encoded in parallel. As shown, in slow motion video processing mode 130, batching of frames may be performed (e.g., frame batching module 105 may be ON and may have a batch size setting such as four frames or the like).

As discussed, video pipeline 100 may be operated in a slow motion video processing mode 130 or a standard video processing mode 120. In some examples, video pipeline 100 may be operated in slow motion video processing mode 130 and a standard video presentation mode. For example, video frames 121 or the like may be presented to a user via a display while encoded bitstream 136 is generated for slow motion video.

Furthermore, video pipeline 100 may implement a threshold frame capture rate (e.g., via mode module 102 such that slow motion video processing mode 130 is applied if requested frame capture rate is not less than the threshold frame capture rate) and a batch size (e.g., defining a number of frames for batches of video frames 132, 133). Such parameters may be preset and/or they may be modified during the implementation of video pipeline 100. For example, modifying such parameters may provide adaptive batch optimization via video pipeline 100. As discussed, the threshold frame capture rate (e.g., recording frame rate threshold) may be used to differentiate between slow motion video recording and common or standard video recording. As discussed, in some examples, the batch mechanisms discussed herein may be enabled for slow motion video recording.

Furthermore, the batch size parameter may determine or define the number of frames passed to GPU 107 in each batch-wise submission. As discussed, the batch size may be any suitable number of frames such as four or the like. For example, in a 120 fps slow motion recording example, the camera recording stream (e.g., video frames 131) may output frames at 120 fps and frame batching module 105 (e.g., provided as a plug-in or the like) may buffer the frames (e.g., video frames 131) and make batch-wise submissions to media driver 106 and GPU 107 at a cadence of one batch (e.g., four frames) every $\frac{1}{30}^{th}$ of a second. In such examples, GPU 107 may receive an encode task of four frames of 720P at 30 batches per second.

Figure 2:
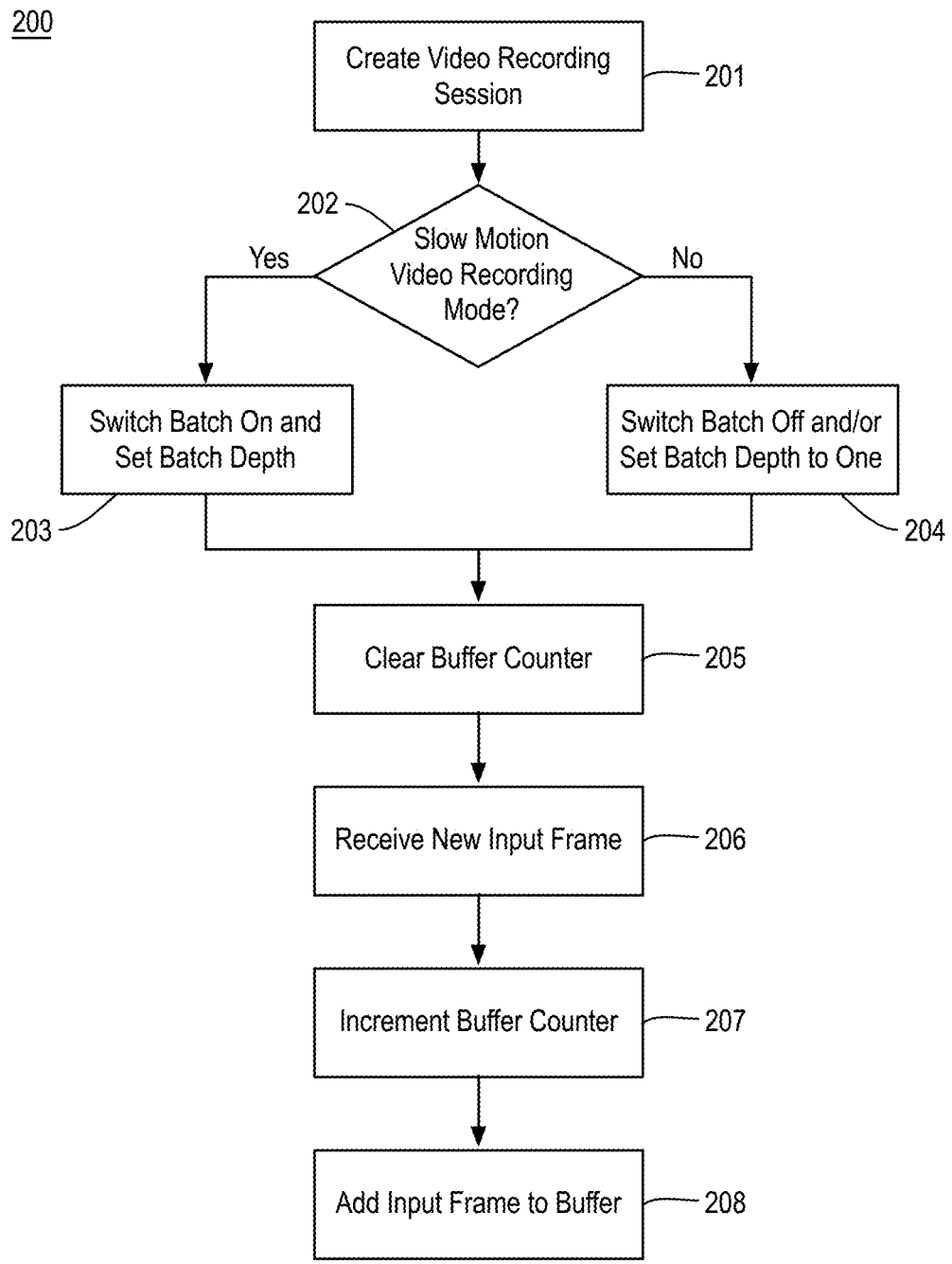
FIG. 2 is a flow diagram illustrating an example process for controlling video recording and the buffering of video frames.

FIG. 2 is a flow diagram illustrating an example process 200 for controlling video recording and the buffering of video frames, arranged in accordance with at least some implementations of the present disclosure. Process 200 may include one or more operations 201-208 as illustrated in FIG. 2. Process 200 may be performed by a device or system (e.g., system 500, system 600, device 700, or any other devices, systems, or subsystems discussed herein) or portions of process 200 may be performed to control video recording and buffer video frames. Process 200 or portions thereof may be repeated for any number of video recording sessions, or the like. Furthermore, process 200 may be performed in conjunction with process 300 to perform video recording as discussed herein.

Figure 3:
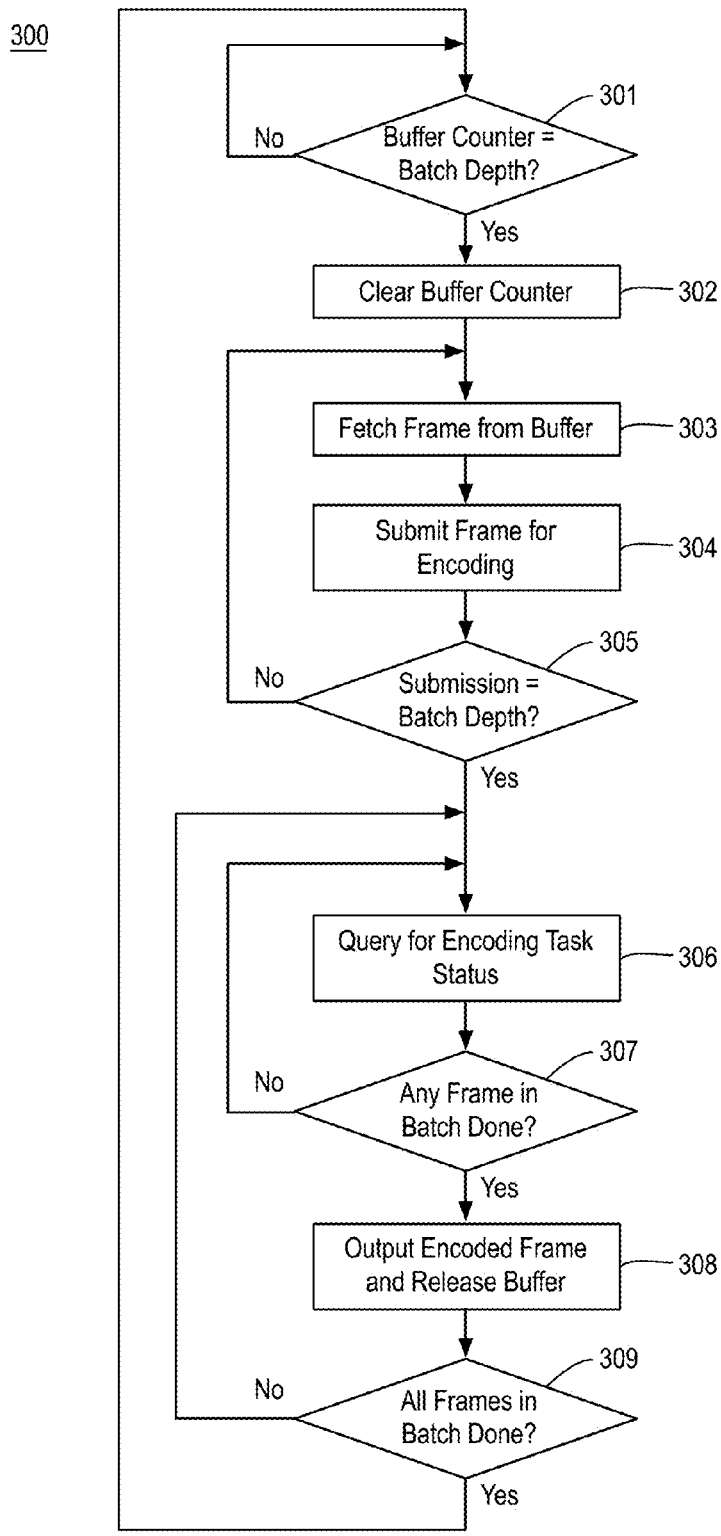
FIG. 3 is a flow diagram illustrating an example process for retrieving video frames, submitting video frames for encoding, and monitoring encoding to release a buffer.

FIG. 3 is a flow diagram illustrating an example process 300 for retrieving video frames, submitting video frames for encoding, and monitoring encoding to release a buffer, arranged in accordance with at least some implementations of the present disclosure. Process 300 may include one or more operations 301-309 as illustrated in FIG. 3. Process 300 may be performed by a device or system (e.g., system 500, system 600, device 700, or any other devices, systems, or subsystems discussed herein) or portions of process 200 may be performed to retrieve video frames, submit video frames for encoding, and monitor the encoding to release a buffer. Process 300 or portions thereof may be repeated for any number of video frame batches, or the like.

As discussed, process 200 and process 300 may be performed together to provide video recording as discussed herein. For example, process 200 may provide a main thread and process 300 may provide a worker thread for providing video recording. In some embodiments, the main thread and the worker thread may be provided via a central processor or the like. In some examples, process 200 and process 300 may be implemented as plug-ins, extensions, or the like to an existing system process. Furthermore, process 200 and process 300 may provide for recording in both standard mode and slow motion mode as discussed herein.

Returning to FIG. 2, process 200 may begin at operation 201, "Create Video Recording Session", where a video recording session may be created. The video recording session may be created using any suitable technique or techniques. For example, the video recording session may be initiated by an input received by a user (e.g., via an input device such as a touch screen or the like) or by a process or application or the like.

Processing may continue at decision operation 202, "Slow Motion Video Recording Mode?", where a determination may be made as to whether processing is to continue in a slow motion video recording mode or a standard video recording mode. Such a determination may be made using any suitable technique or techniques. In some embodiments, a user, process, application, or the like may provide for a mode selection between slow motion or standard recording or the like. In some embodiments, a user, process, application, or the like may request a frame capture rate (e.g., provide a requested frame capture rate) and, at operation 202, the requested frame capture rate may be compared to a threshold (e.g., a threshold frame capture rate) to determine whether processing is to continue in a slow motion video recording mode or a standard video recording mode. For example, if the requested frame capture rate is not less than the threshold frame capture rate, processing may continue in slow motion video recording mode and, if the requested frame capture rate is less than the threshold frame capture rate, processing may continue in a standard recording mode.

If standard video recording is selected (e.g., slow motion video recording is not selected), processing may continue at operation 204, "Switch Batch Off and/or Set Batch Depth to One", where batch processing may be switched off and/or a batch depth may be set to one (e.g., set batch_depth=1). For example, turning off batch processing off may effectively set the batch depth to one as frames, in standard video recording mode, may be submitted for encoding individually (e.g., with a batch depth of one).

If slow motion video recording is selected at decision operation 202, processing may continue at operation 203, "Switch Batch On and Set Batch Depth", where batch processing may be switched on and/or a batch depth may be set to a value greater than one (e.g., set batch_depth=4 or the like). As discussed, the batch depth may be any suitable value such as two or more. For example, the batch depth may determine the number of frames in an encode batch to be submitted to an encoder.

Process 200 may continue from operation 203 or operation 204 at operation 205, "Clear Buffer Counter", where a buffer counter may be cleared. For example, the buffer counter may maintain a count of the number of frames currently in a buffer. For example, process 200 may clear and/or increment the buffer counter and, as discussed further herein, process 300 may read the buffer counter (and clear the buffer counter). For example, a main thread implementing process 200 may write the buffer counter and a worker thread implementing process 300 may read the buffer counter (and clear the buffer counter).

Processing may continue at operation 206, "Receive New Input Frame", where a new input video frame may be received or retrieved. For example, a new input frame may be received from a camera, camera module, or the like during the current video recording session. As discussed, the input video frame may a preprocessed video frame and the input video frame may include any suitable image or video data such as YUV data or the like.

Processing may continue at operation 207, "Increment Buffer Counter", where the buffer counter may be incremented based on the new input frame. As discussed, the buffer counter may maintain a count of the number of frames currently in a buffer such that the buffer counter may be read as discussed with respect to process 300.

Processing may continue at operation 208, "Add Input Frame to Buffer", where the input frame received via operation 206 may be added to a buffer or an intermediate pool or the like. The input frame may be added to the buffer or intermediate pool using any suitable technique or techniques. In some examples, the buffer may be implemented as a ring buffer or the like implemented via memory. Furthermore, process 200 may repeat operations 206-208 for received input frames. For example, operations 206-208 may buffer one video frame (e.g., when in a standard recording mode) or multiple video frames (e.g., when in a slow motion video recording mode) for submission for encoding via process 300. Furthermore, as discussed with respect to process 300, the buffer counter may be cleared via operation 302 when a submission of video frames sequence is started.

As discussed, process 200 and process 300 may be performed together to provide video recording. Turning now to FIG. 3, process 300 may begin at decision operation 301, "Buffer Counter=Batch Depth?", where a determination may be made as to whether the buffer counter is equal to the batch depth. For example, the batch depth determined at operation 203 and the buffer counter provided as discussed with respect to process 200 may be read. The batch depth and the buffer counter may be compared to determine whether they are equal (e.g., buffer_counter=batch_depth?). If not, process 300 may continue at decision operation 301 until the buffer counter reaches the batch depth. As discussed, the batch depth may be any number such as one (e.g., batching is off) or two or more (e.g., batching is on).

If the buffer counter equals the batch depth, processing may continue at operation 302, "Clear Buffer Counter", where the buffer counter may be cleared. For example, operations 303-305 may provide a submit video sequence where one video frame (e.g., when in a standard recording mode) or an encode batch of multiple video frames (e.g., when in a slow motion video recording mode) may be submitted for encoding.

Processing may continue at operation 303, "Fetch Frame from Buffer", where a frame may be fetched or retrieved from the buffer or intermediate pool as discussed with respect to operation 208 of process 200. The frame may be fetched or retrieved using any suitable technique or techniques. For example, the frame may be fetched or retrieved from a ring buffer or the like implemented via memory.

Processing may continue at operation 304, "Submit Frame for Encoding", where the frame fetched or retrieved via operation 303 may be submitted for encoding. The frame may be submitted for encoding using any suitable technique or techniques. For example, the frame may be submitted for encoding via an encoder implemented via a graphics processor. In some embodiments, the frame may be submitted for encoding via a media driver such as media driver 106.

Processing may continue at decision operation 305, "Submission=Batch Depth?", where a determination may be made as to whether the current submission (e.g., as implemented via a counter or the like) is equal to the batch depth. If so, processing may continue at operation 306 as further discussed below. If not, processing may continue at operations 303-305 until all frames of the current batch are fetched and submitted for encoding. For example, in a standard video recording mode, one frame may be fetched and submitted via operations 303-305 before process 300 moves to operation 306. In a slow motion video recording mode, operations 303-305 may fetch and submit an encode batch of video frames having a number of video frames equal to the batch depth. Operations 303-305 may fetch and submit such video frames sequentially (e.g., in relatively rapid succession) as discussed or such an encode batch may be fetched, held, and submitted together for encoding.

The encoding of such frames may be performed via an encoder as discussed herein. Such encoding may be monitored via operation 306 for example as is discussed further herein. Such encoding may be performed while another subsequent encode batch is being buffered for processing. For example, a subsequent encode batch may be generated via operations 206-208 at least partially during the encoding of the current encode batch. Furthermore, upon completion of the current encode batch, the processor (e.g., a graphics processor or the like) may enter a sleep state. As discussed, the provided batching in the slow motion video recording mode may provide longer continuous durations of idle time for the processor, which may allow the processor to enter a deeper sleep state. Such deeper sleep state durations may provide for lower power usage.

Based on the subsequent batch being buffered and/or a timing signal, the processor may be woken from its sleep state for processing of the subsequent batch. For example, the subsequent batch may be completely buffered at a timing of the batch depth over the frame rate (e.g., 4/120 seconds for the example of a batch depth of 4 and a frame rate of 120 fps) such that every 33.3 ms a new encode batch is provided to the encoder. Furthermore, if the encoder requires less than about 10 ms to encode each batch, the processor providing the encoding may enter a sleep state for more than about 23 ms (e.g., the batch depth over the frame rate less the encode duration for the batch).

Processing may continue at operation 306, "Query for Encoding Task Status", where the encoding task status of the encode batch may be queried and/or monitored. The encoding task status may be monitored using any suitable technique or techniques such as monitoring task completion of an encoder as implemented by GPU 107 via media driver 106 or the like.

Processing may continue at decision operation 307, "Any Frame in Batch Done?", where a determination may be made as to whether any frame in the current batch has completed encoding. If not, processing may continue at operations 306 and 307 until a frame completes encoding.

If so, processing may continue at operation 308, "Output Encoded Frame and Release Buffer", where the completed encoded frame may be outputted and the surface or buffer portion or the like associated with the completed frame may be released. For example, the completed encoded frame may be outputted as an encoded bitstream to be stored via memory, transmitted, or the like. In some examples, the completed frame may be added to a video container or the like. Furthermore, the encoded bitstream may be subsequently decoded for presentment to a user locally (e.g., on the same device implementing processes 200 and 300) or remotely (e.g., via a remote device). The buffer portion or frame or surface or the like associated with the completed frame may be released such that a subsequent video frame may occupy it. For example, the buffer portion of the memory may be released back to a camera, a camera module, a media framework, a camera framework, or the like.

Processing may continue at decision operation 309, "All Frames in Batch Done?", where a determination may be made as to whether all frames in the current batch have completed encoding. If not, processing may continue at operations 306-309 until all frames complete encoding. In the example of standard video recording, since the batch size is one, decision operation 307 and decision operation 309 may provide the same result and decision operation 309 may optionally be skipped.

If so, processing may continue at decision operation 301 as discussed herein. For example, the buffer counter cleared at operation 302 may have been incremented via operation 207 of process 200 as one or more frame(s) are received (e.g., via operation 206) and added to the input frame buffer (e.g., via operation 208), please refer to FIG. 2.

As discussed, processes 200 and 300 may provide adaptive batching of encode tasks for slow motion video recording and single batch (e.g., batching off) processing of encode tasks for standard video recording. Processes 200 and 300 may be performed simultaneously and/or in serial to provide such video recording processing. Furthermore, some portions of either process 200 or process 300 or both may be performed in parallel to provide such video recording processing. In some examples, processes 200 and 300 may be provided as a main thread and a worker thread, respectively as implemented via a central processor to control video recording.

The techniques discussed herein may provide substantial power savings. For example, without the described batching, an example slow motion recording of 720P frames at 120 fps may provide a workload to the processor implementing the encoder (e.g., a GPU) about every 8.3 ms (e.g., a 1/120 fps duty cycle). In each 8.3 ms duty cycle, one frame of 720P encoding may finish in about 3 ms allowing the processor to idle for the remaining 5.3 ms. Furthermore, such processing may not allow for concurrency between encode tasks on different engines of the processor.

Using the adaptive batching techniques discussed herein and continuing the example of slow motion recording of 720P frames at 120 fps, the encoder processor workload may be batched for every four (e.g., the batch depth) continuous frames Furthermore, parallel processing may be provide for two or more of the batched frames and concurrency may occur on such encode tasks between engines of the processor. For example, for every four continuous frames, encoding tasks may be completed in about <10 ms providing the processor an idle time of >23 ms. Table 1 illustrates processor residency benefits provided via the techniques discussed herein.

TABLE 1

GPU Residency Benefit from Batching in 720P, 120 fps video recording

| GPU C State Residency | Without Batching | With Batching |
| --- | --- | --- |
| RENDER C0 | 59.9% | 40.4% |
| RENDER C1 | 3.8% | 4.2% |
| RENDER C6 | 36.2% | 55.1% |
| MEDIA C0 | 41.0% | 27.6% |
| MEDIA C1 | 4.0% | 4.9% |
| MEDIA C6 | 64.9% | 77.2% |

As shown in Table 1, the processor implementing encoding (e.g. GPU 107 or the like) may reside in power state (e.g., C State) render C0 a substantially lower percentage of time (e.g., 40.4% as compared to 59.9%) and in deep sleep power state render C6 a substantially greater percentage of time (e.g., 55.1% as compared to 36.2%) as compared to operation without batching. Similarly, the processor may reside in power state media C0 a substantially lower percentage of time (e.g., 27.6% as compared to 41.0%) and in deep sleep power state media C6 a substantially greater percentage of time (e.g., 77.2% as compared to 64.9%) as compared to operation without batching. Such residency data evidence substantial power consumption improvement of the processor and therefore the device implementing the batching discussed herein.

Figure 4:
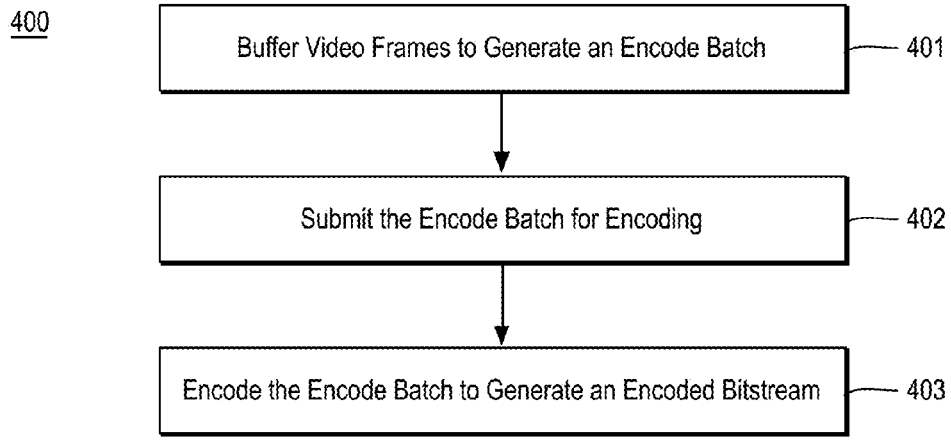
FIG. 4 is a flow diagram illustrating an example process for adaptively batching encode tasks for slow motion video recording.

FIG. 4 is a flow diagram illustrating an example process 400 for adaptively batching encode tasks for slow motion video recording, arranged in accordance with at least some implementations of the present disclosure. Process 400 may include one or more operations 401-403 as illustrated in FIG. 4. Process 400 may form at least part of a slow motion video recording process. By way of non-limiting example, process 400 may form at least part of a video compositing process as performed by any device or system as discussed herein. Furthermore, process 400 will be described herein with reference to system 500 of FIG. 5.

Figure 5:
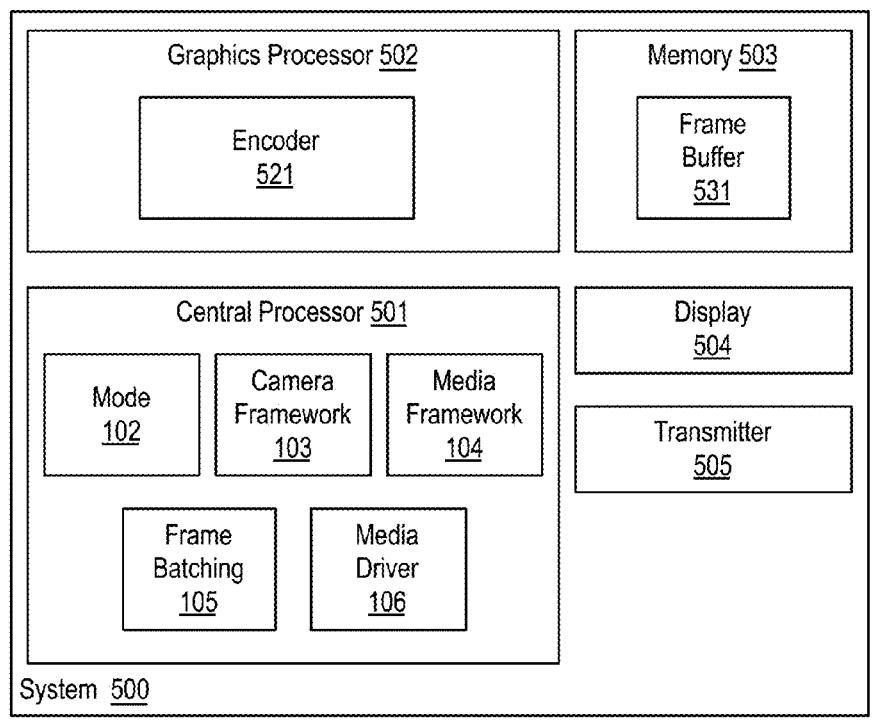
FIG. 5 is an illustrative diagram of an example system for adaptively batching encode tasks for slow motion video recording.

FIG. 5 is an illustrative diagram of an example system 500 for adaptively batching encode tasks for slow motion video recording, arranged in accordance with at least some implementations of the present disclosure. As shown in FIG. 5, system 500 may include a central processor 501, a graphics processor 502, memory 503, a display 504, and a transmitter 505. Also as shown, central processor 501 may include or implement mode module 102, camera framework 103, media framework, 104, frame batching module 105, and media driver 106, graphics processor 502 may include or implement an encoder 521, and memory 503 may include frame buffer 531. In the example of system 500, memory 503 may also store video data or related content such as pixel data, control data, and/or any other data as discussed herein.

As shown, in some examples, mode module 102, camera framework 103, media framework, 104, frame batching module 105, and media driver 106 may be implemented via central processor 501. In other examples, one or more portions mode module 102, camera framework 103, media framework, 104, frame batching module 105, and media driver 106 may be implemented via graphics processor 502, or another processing unit. Furthermore, as shown, in some examples, encoder 521 may be implemented via graphics processor 502. In other examples, encoder 521 or portions thereof may be implemented via central processor 501, or another processing unit.

Graphics processor 502 may include any number and type of graphics processing units that may provide the operations as discussed herein. Such operations may be implemented via software or hardware or a combination thereof. For example, graphics processor 502 may include circuitry dedicated to manipulate video frames, video data, image data or the like obtained from memory 503. Central processor 501 may include any number and type of processing units or modules that may provide control and other high level functions for system 500 and/or provide any operations as discussed herein. Memory 503 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 503 may be implemented by cache memory.

In an embodiment, encoder 521 or portions thereof may be implemented via an execution unit (EU) of graphics processor 502. The EU may include, for example, programmable logic or circuitry such as a logic core or cores that may provide a wide array of programmable logic functions. In an embodiment, encoder 521 or portions thereof may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 4, process 400 may begin at operation 401, "Buffer Video Frames to Generate an Encode Batch", where, in a slow motion video recording mode, multiple video frames may be buffered to generate an encode batch including the multiple video frames. For example, frame batching module 105 as implemented via central processor 501 may store the multiple input frames to frame buffer 531 as implemented via memory 503 to generate the encode batch including the multiple video frames.

In some examples, prior to operation 401, process 400 may include entering the slow motion video recording mode based on a requested frame capture rate and a threshold frame capture rate. For example, the slow motion video recording mode may be entered based on the requested frame capture rate being not less than the threshold frame capture rate. For example, mode module 102 as implemented via central processor 501 may determine the slow motion video recording mode based on the requested frame capture rate and the threshold frame capture rate. In other examples, entering the slow motion video recording mode may be based on a slow motion video recording request signal. For example, mode module 102 as implemented via central processor 501 may determine the slow motion video recording mode based on the received the slow motion video recording request signal.

Furthermore, in some examples, prior to operation 401, process 400 may include setting a batch size associated with the encode batch, wherein the batch size may determine a number of video frames in the multiple video frames. As discussed, the batch size may include any number of video frames such a four video frames or the like. For example, a user selection or an application or the like may generate an indication of the batch size, which may be detected and set via mode module 102 or another module of central processor 501.

Processing may continue at operation 402, "Submit the Encode Batch for Encoding", where the encode batch including the multiple video frames may be submitted for encoding. For example, the encode batch may be submitted by media driver 106 as implemented via central processor 501 for encoding vie encoder 521 as implemented via graphics processor 502. The encode batch may be submitted for encoding using any suitable technique or techniques. For example, the multiple video frames of the encode may be submitted sequentially or they may be submitted together.

Processing may continue at operation 403, "Encode the Encode Batch to Generate an Encoded Bitstream", where the encode batch may be encoded to generate an encoded bitstream. For example, encoder 521 as implemented via graphics processor 502 may encode the encode batch to generate the encoded bitstream. The multiple frames of the encode batch may be encoded in series or in parallel. For example, two or more of the multiple frames may be encoded in parallel. Furthermore, the multiple frames of the encode batch may be encoded during a continuous active state of graphics processor 502 (e.g., graphics processor 502 may not enter a sleep state during the encode of the multiple frames).

In some examples, prior to operation 403 or as a part of operation 403, the processor implementing encoder 521 (e.g., graphics processor 502) may woken from a sleep state. For example, process 400 may wake graphics processor 502 from the sleep state based on the encode batch. Graphics processor 502 may be awoken from any suitable sleep state such as a C6 sleep state or the like to any active state such as C0 active state or the like. Furthermore, in some examples, the processor implementing encoder 521 (e.g., graphics processor 502) may be entered into a sleep state (e.g., a C6 sleep state or the like) upon completion of the encode batch. For example, the processor implementing encoder 521 (e.g., graphics processor 502) may be awoken from the sleep state based on a subsequent encode batch, entered into a sleep state based on completion of the subsequent encode batch, and so on.

Furthermore, as discussed herein, during operation 403 or at least partially during operation 403, a subsequent encode batch may be buffered as discussed with respect to operation 401. For example, after starting the encode of the current encode batch, a subsequent first frame of the subsequent encode batch may be buffered either before the encode of the of the current encode batch has finished or after the encode of the current encode batch has finished. Such buffering may continue (e.g., while the processor implementing encoder 521 is in a sleep state) until the batch size is met. The subsequent encode batch may then be submitted for encoding and the processor implementing encoder 521 may be brought to an active state to encode the subsequent encode batch during a continuous active state of the processor.

As discussed herein, in some embodiments, process 400 may include implementing a main thread to provide the buffering of the plurality of video frames to generate the encode batch comprising the multiple video frames. For example, the main thread may be implemented via central processor 501. In some examples, the main thread may add each of the video frames to a buffer to generate the encode batch and increase a buffer counter based on adding each of the video frames as discussed herein with respect to process 200.

Furthermore, process 400 may include implementing a worker thread to provide the submitting of the encode batch including the multiple video frames for encoding and to monitor the encoding of the encode batch. For example, the worker thread may be implemented via central processor 501. In some examples, the worker thread may fetch the video frames from the buffer based on the buffer counter reaching a batch depth associated with the encode batch, provide the video frames to a graphics processor for encoding, and, upon a first frame of the video frames completing encoding, release a buffer portion of the buffer associated with the first frame as discussed herein with respect to process 300.

Process 400 may be repeated any number of times either in series or in parallel for any number encode operations, video frames, video frame batches, video recording sessions, or the like. As discussed, process 400 may provide for adaptively batching encode tasks for slow motion video recording. For example, the discussed techniques for batching encode tasks may provide computationally efficient and low power slow motion video recording.

Various components of the systems described herein may be implemented in software, firmware, and/or hardware and/or any combination thereof. For example, various components of video pipeline 100, system 500, system 600, or device 700 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of process 200, process 300, process 400 or any operations discussed herein and/or any portions of video pipeline 100, system 500, system 600, or device 700, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 6:
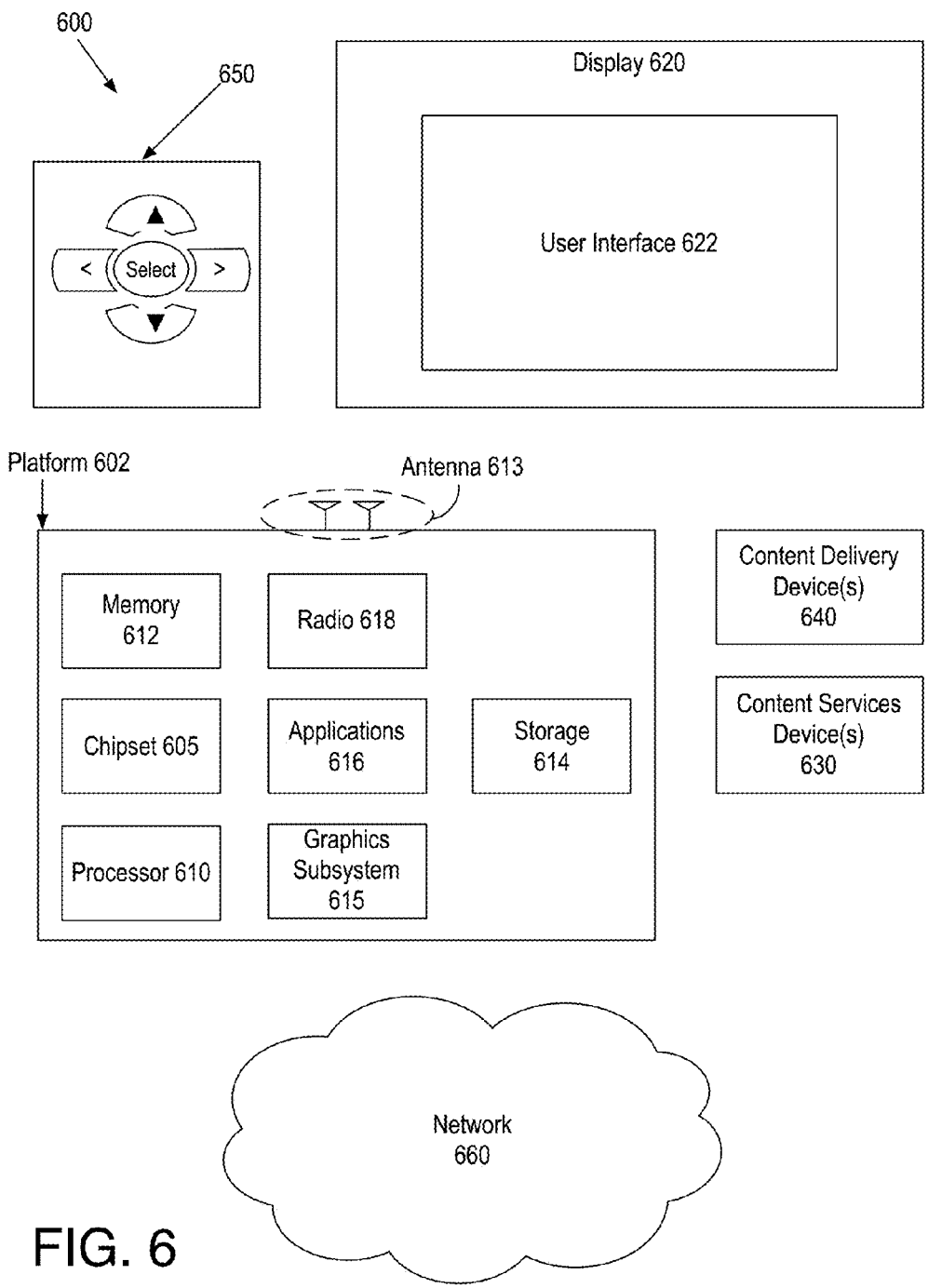
FIG. 6 is an illustrative diagram of an example system.

FIG. 6 is an illustrative diagram of an example system 600, arranged in accordance with at least some implementations of the present disclosure. In various implementations, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 600 includes a platform 602 coupled to a display 620. Platform 602 may receive content from a content device such as content services device(s) 630 or content delivery device(s) 640 or other similar content sources. A navigation controller 650 including one or more navigation features may be used to interact with, for example, platform 602 and/or display 620. Each of these components is described in greater detail below.

In various implementations, platform 602 may include any combination of a chipset 605, processor 610, memory 612, antenna 613, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 610 may be dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 may be integrated into processor 610 or chipset 605. In some implementations, graphics subsystem 615 may be a stand-alone device communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any television type monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In various implementations, content services device(s) 630 may include a cable television box, personal computer, network, telephone, Internet enabled devices or appliance capable of delivering digital information and/or content, and any other similar device capable of uni-directionally or bi-directionally communicating content between content providers and platform 602 and/display 620, via network 660 or directly. It will be appreciated that the content may be communicated uni-directionally and/or bi-directionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 602 may receive control signals from navigation controller 650 having one or more navigation features. The navigation features of controller 650 may be used to interact with user interface 622, for example. In various embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In various embodiments, controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off." In addition, chipset 605 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
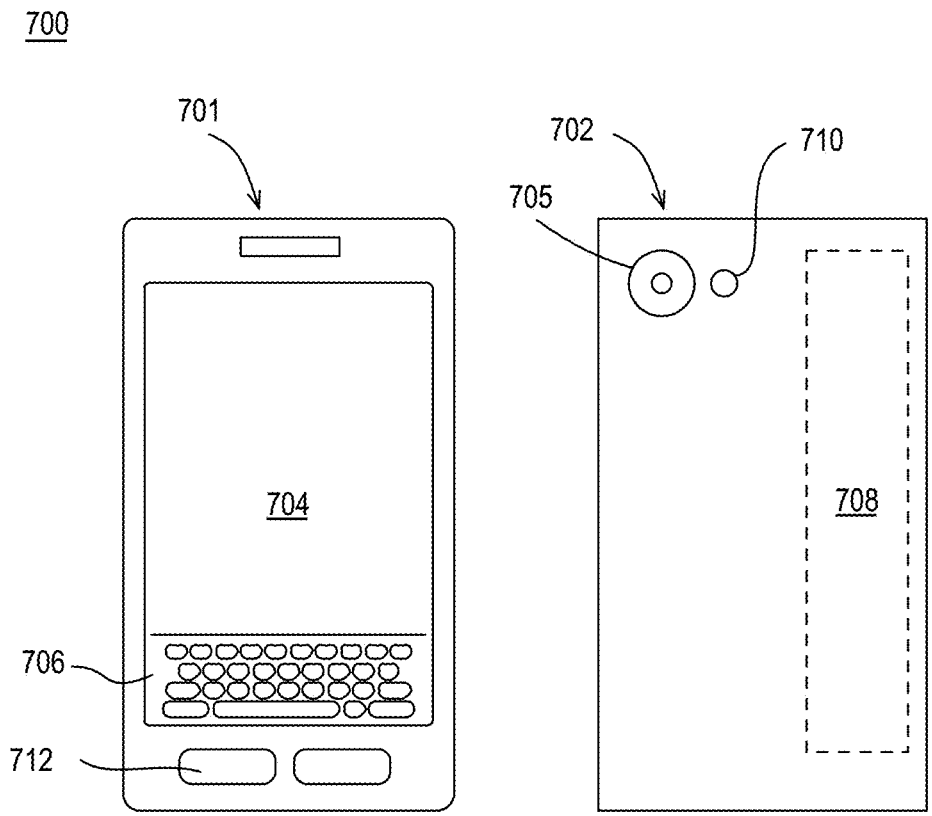
FIG. 7 illustrates an example device, all arranged in accordance with at least some implementations of the present disclosure.

As described above, system 600 may be embodied in varying physical styles or form factors. FIG. 7 illustrates an example small form factor device 700, arranged in accordance with at least some implementations of the present disclosure. In some examples, system 600 may be implemented via device 700. In other examples, video pipeline 100, system 500, or portions thereof may be implemented via device 700. In various embodiments, for example, device 700 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a housing with a front 701 and a back 702. Device 700 includes a display 704, an input/output (I/O) device 706, and an integrated antenna 708. Device 700 also may include navigation features 712. I/O device 706 may include any suitable I/O device for entering information into a mobile computing device. Examples for I/O device 706 may include an alphanumeric keyboard, a numeric keypad, a touch pad, input keys, buttons, switches, microphones, speakers, voice recognition device and software, and so forth. Information also may be entered into device 700 by way of microphone (not shown), or may be digitized by a voice recognition device. As shown, device 700 may include a camera 705 (e.g., including a lens, an aperture, and an imaging sensor) and a flash 710 integrated into back 702 (or elsewhere) of device 700. In other examples, camera 705 and flash 710 may be integrated into front 701 of device 700 or both front and back cameras may be provided. Camera 705 and flash 710 may be components of a camera module to originate image data processed into streaming video that is output to display 704 and/or communicated remotely from device 700 via antenna 708 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for adaptively batching encode tasks for slow motion video recording comprises buffering, in a slow motion video recording mode, a plurality of video frames to generate an encode batch comprising the plurality of video frames, submitting the encode batch comprising the plurality of video frames for encoding, and encoding the encode batch to generate an encoded bitstream.

Further to the first embodiments, the method further comprises buffering, at least partially during the encoding of the encode batch, a second plurality of video frames to generate a second encode batch comprising the second plurality of video frames.

Further to the first embodiments, encoding the encode batch comprises encoding the encode batch via a graphics processor and the method further comprises waking the graphics processor from a sleep state based on the encode batch, wherein encoding the encode batch comprises encoding during a continuous active state of the graphics processor.

Further to the first embodiments, encoding the encode batch comprises encoding the encode batch via a graphics processor and the method further comprises waking the graphics processor from a sleep state based on the encode batch, wherein encoding the encode batch comprises encoding during a continuous active state of the graphics processor, buffering, at least partially during the encoding of the encode batch, a second plurality of video frames to generate a second encode batch comprising the second plurality of video frames, entering the graphics processor into a second sleep state upon completion of the encode batch, and waking the graphics processor from the second sleep state based on the second encode batch, wherein encoding the second encode batch comprises encoding during a second continuous active state of the graphics processor.

Further to the first embodiments, the method further comprises entering the slow motion video recording mode based on a requested frame capture rate being not less than a threshold frame capture rate.

Further to the first embodiments, the method further comprises entering the slow motion video recording mode based on a slow motion video recording request signal.

Further to the first embodiments, the method further comprises setting a batch size associated with the encode batch, wherein the batch size determines a number of video frames in the plurality of video frames.

Further to the first embodiments, the method further comprises entering the slow motion video recording mode based on a requested frame capture rate being not less than a threshold frame capture rate or entering the slow motion video recording mode based on a slow motion video recording request signal and/or setting a batch size associated with the encode batch, wherein the batch size determines a number of video frames in the plurality of video frames Further to the first embodiments, the method further comprises implementing a main thread to provide the buffering of the plurality of video frames to generate the encode batch comprising the plurality of video frames and implementing a worker thread to provide the submitting of the encode batch comprising the plurality of video frames for encoding and to monitor the encoding of the encode batch.

Further to the first embodiments, the method further comprises implementing a main thread to provide the buffering of the plurality of video frames to generate the encode batch comprising the plurality of video frames and implementing a worker thread to provide the submitting of the encode batch comprising the plurality of video frames for encoding and to monitor the encoding of the encode batch, wherein the main thread is to add each of the video frames to a buffer to generate the encode batch and to increase a buffer counter based on adding each of the video frames.

Further to the first embodiments, the method further comprises implementing a main thread to provide the buffering of the plurality of video frames to generate the encode batch comprising the plurality of video frames and implementing a worker thread to provide the submitting of the encode batch comprising the plurality of video frames for encoding and to monitor the encoding of the encode batch, wherein the main thread is to add each of the video frames to a buffer to generate the encode batch and to increase a buffer counter based on adding each of the video frames and the worker thread is to fetch the video frames from the buffer based on the buffer counter reaching a batch depth associated with the encode batch and provide the video frames to a graphics processor for encoding.

Further to the first embodiments, the method further comprises implementing a main thread to provide the buffering of the plurality of video frames to generate the encode batch comprising the plurality of video frames and implementing a worker thread to provide the submitting of the encode batch comprising the plurality of video frames for encoding and to monitor the encoding of the encode batch, wherein the main thread is to add each of the video frames to a buffer to generate the encode batch and to increase a buffer counter based on adding each of the video frames and the worker thread is to fetch the video frames from the buffer based on the buffer counter reaching a batch depth associated with the encode batch and provide the video frames to a graphics processor for encoding, wherein the worker thread is further to, upon a first frame of the video frames completing encoding, release a buffer portion of the buffer associated with the first frame.

Further to the first embodiments, the method further comprises implementing a main thread to provide the buffering of the plurality of video frames to generate the encode batch comprising the plurality of video frames and implementing a worker thread to provide the submitting of the encode batch comprising the plurality of video frames for encoding and to monitor the encoding of the encode batch, wherein the main thread is to add each of the video frames to a buffer to generate the encode batch and to increase a buffer counter based on adding each of the video frames and/or wherein the worker thread is to fetch the video frames from the buffer based on the buffer counter reaching a batch depth associated with the encode batch and provide the video frames to a graphics processor for encoding.

Further to the first embodiments, submitting the encode batch comprises sequentially submitting the plurality of video frames of the encode batch.

Further to the first embodiments, encoding the encode batch comprises encoding two or more of the plurality of video frames in parallel.

In one or more second embodiments, a system for adaptively batching encode tasks for slow motion video recording comprises a memory comprising a buffer for storing video frames, a central processor coupled to the memory, the central processor to, in a slow motion video recording mode, store to the buffer a plurality of video frames to generate an encode batch comprising the plurality of video frames, and a graphics processor to encode the encode batch during a continuous active state of the graphics processor to generate an encoded bitstream.

Further to the second embodiments, the central processor is further to store to the buffer, at least partially during the encode of the encode batch, a second plurality of video frames to generate a second encode batch comprising the second plurality of video frames.

Further to the second embodiments, the central processor is further to store to the buffer, at least partially during the encode of the encode batch, a second plurality of video frames to generate a second encode batch comprising the second plurality of video frames and the graphics processor is further to enter a sleep state upon completion of the encode batch and to wake from the sleep state based on the second encode batch.

Further to the second embodiments, the central processor is further to enter the slow motion video recording mode based on a requested frame capture rate being not less than a threshold frame capture rate.

Further to the second embodiments, the central processor is further to enter the slow motion video recording mode based on a slow motion video recording request signal.

Further to the second embodiments, the central processor is further to set a batch size associated with the encode batch, wherein the batch size determines a number of video frames in the plurality of video frames.

Further to the second embodiments, the central processor is further to implement a main thread to add the video frames to the buffer to generate the encode batch comprising the plurality of video frames and to implement a worker thread to submit the encode batch comprising the plurality of video frames to the graphics processor and to monitor the encode of the encode batch.

Further to the second embodiments, the central processor is further to implement a main thread to add the video frames to the buffer to generate the encode batch comprising the plurality of video frames and to implement a worker thread to submit the encode batch comprising the plurality of video frames to the graphics processor and to monitor the encode of the encode batch, wherein the central processor is further to, via the main thread, increase a buffer counter based on an addition of each of the video frames, and to, via the worker thread, fetch the video frames from the buffer based on the buffer counter reaching a batch depth associated with the encode batch.

Further to the second embodiments, the central processor is further to implement a main thread to add the video frames to the buffer to generate the encode batch comprising the plurality of video frames and to implement a worker thread to submit the encode batch comprising the plurality of video frames to the graphics processor and to monitor the encode of the encode batch, wherein the central processor is further to, via the main thread, increase a buffer counter based on an addition of each of the video frames and, upon encode completion of a first frame of the plurality of video frames, release a buffer portion of the buffer associated with the first frame, and to, via the worker thread, fetch the video frames from the buffer based on the buffer counter reaching a batch depth associated with the encode batch.

Further to the second embodiments, the central processor is further to implement a main thread to add the video frames to the buffer to generate the encode batch comprising the plurality of video frames and to increase a buffer counter based on an addition of each of the video frames, and the central processor is further to implement a worker thread to submit the encode batch comprising the plurality of video frames to the graphics processor, to monitor the encode of the encode batch, and to fetch the video frames from the buffer based on the buffer counter reaching a batch depth associated with the encode batch.

Further to the second embodiments, the graphics processor is to encode two or more of the plurality of video frames of the encode batch in parallel.

Further to the second embodiments, the central processor and the graphics processor comprise a system on a chip.

In one or more third embodiments, a system for adaptively batching encode tasks for slow motion video recording comprises means for buffering, in a slow motion video recording mode, a plurality of video frames to generate an encode batch comprising the plurality of video frames, means for submitting the encode batch comprising the plurality of video frames for encoding, and means for encoding the encode batch to generate an encoded bitstream.

Further to the third embodiments, the system further comprises means for buffering, at least partially during the encoding of the encode batch, a second plurality of video frames to generate a second encode batch comprising the second plurality of video frames.

Further to the third embodiments, the system further comprises means for waking the means for encoding from a sleep state based on the encode batch, wherein the means for encoding comprise means for encoding the encode batch during a continuous active state.

Further to the third embodiments, means for waking the means for encoding from a sleep state based on the encode batch, wherein the means for encoding comprise means for encoding the encode batch during a continuous active state, means for buffering, at least partially during the encoding of the encode batch, a second plurality of video frames to generate a second encode batch comprising the second plurality of video frames, means for entering the means for encoding into a second sleep state upon completion of the encode batch, and means for waking the means for encoding from the second sleep state based on the second encode batch.

Further to the third embodiments, the system further comprises means for entering the slow motion video recording mode based on a requested frame capture rate being not less than a threshold frame capture rate.

Further to the third embodiments, the system further comprises means for entering the slow motion video recording mode based on a slow motion video recording request signal.

Further to the third embodiments, the system further comprises means for setting a batch size associated with the encode batch, wherein the batch size determines a number of video frames in the plurality of video frames.

Further to the third embodiments, the system further comprises means for implementing a main thread to provide the encode batch to the means for buffering and means for implementing a worker thread to submit the encode batch to the means for encoding and to monitor encoding of the encode batch.

Further to the third embodiments, the system further comprises means for implementing a main thread to provide the encode batch to the means for buffering and means for implementing a worker thread to submit the encode batch to the means for encoding and to monitor encoding of the encode batch, wherein the main thread is to add each of the video frames to the means for buffering to generate the encode batch and to increase a buffer counter based on adding each of the video frames.

Further to the third embodiments, the system further comprises means for implementing a main thread to provide the encode batch to the means for buffering and means for implementing a worker thread to submit the encode batch to the means for encoding and to monitor encoding of the encode batch, wherein the main thread is to add each of the video frames to the means for buffering to generate the encode batch and to increase a buffer counter based on adding each of the video frames and wherein the worker thread is to fetch the video frames from the means for buffering based on the buffer counter reaching a batch depth associated with the encode batch and provide the video frames to the means for encoding.

Further to the third embodiments, the system further comprises means for implementing a main thread to provide the encode batch to the means for buffering and means for implementing a worker thread to submit the encode batch to the means for encoding and to monitor encoding of the encode batch, wherein the main thread is to add each of the video frames to the means for buffering to generate the encode batch and to increase a buffer counter based on adding each of the video frames and wherein the worker thread is to fetch the video frames from the means for buffering based on the buffer counter reaching a batch depth associated with the encode batch, provide the video frames to the means for encoding, and, upon a first frame of the video frames completing encoding, release a buffer portion of the means for buffering associated with the first frame.

Further to the third embodiments, the means for submitting the encode batch comprise means for sequentially submitting the plurality of video frames of the encode batch.

Further to the third embodiments, the means for encoding the encode batch comprise means for encoding two or more of the plurality of video frames in parallel.

In one or more fourth embodiments, at least one machine readable medium comprises a plurality of instructions that, in response to being executed on a computing device, cause the computing device to adaptively batch encode tasks for slow motion video recording by buffering, in a slow motion video recording mode, a plurality of video frames to generate an encode batch comprising the plurality of video frames, submitting the encode batch comprising the plurality of video frames for encoding, and encoding the encode batch to generate an encoded bitstream.

Further to the fourth embodiments, the machine readable medium further comprises instructions that, in response to being executed on the computing device, cause the computing device to adaptively batch encode tasks for slow motion video recording by waking the graphics processor from a sleep state based on the encode batch, wherein encoding the encode batch comprises encoding during a continuous active state of the graphics processor.

Further to the fourth embodiments, the machine readable medium further comprises instructions that, in response to being executed on the computing device, cause the computing device to adaptively batch encode tasks for slow motion video recording by waking the graphics processor from a sleep state based on the encode batch, wherein encoding the encode batch comprises encoding during a continuous active state of the graphics processor, buffering, at least partially during the encoding of the encode batch, a second plurality of video frames to generate a second encode batch comprising the second plurality of video frames, entering the graphics processor into a second sleep state upon completion of the encode batch, and waking the graphics processor from the second sleep state based on the second encode batch, wherein encoding the second encode batch comprises encoding during a second continuous active state of the graphics processor.

Further to the fourth embodiments, the machine readable medium further comprises instructions that, in response to being executed on the computing device, cause the computing device to adaptively batch encode tasks for slow motion video recording by implementing a main thread to provide the buffering of the plurality of video frames to generate the encode batch comprising the plurality of video frames and implementing a worker thread to provide the submitting of the encode batch comprising the plurality of video frames for encoding and to monitor the encoding of the encode batch.

Further to the fourth embodiments, the machine readable medium further comprises instructions that, in response to being executed on the computing device, cause the computing device to adaptively batch encode tasks for slow motion video recording by implementing a main thread to provide the buffering of the plurality of video frames to generate the encode batch comprising the plurality of video frames and implementing a worker thread to provide the submitting of the encode batch comprising the plurality of video frames for encoding and to monitor the encoding of the encode batch, wherein the main thread is to add each of the video frames to a buffer to generate the encode batch and to increase a buffer counter based on adding each of the video frames and wherein the worker thread is to fetch the video frames from the buffer based on the buffer counter reaching a batch depth associated with the encode batch and provide the video frames to a graphics processor for encoding.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for adaptively batching encode tasks for slow motion video recording comprising:
   capturing, via a camera operating in a slow motion video recording mode, first video at a first frame rate of not less than twice a second frame rate of a standard video recording mode;
   buffering, via a memory and in response to the first video being captured in the slow motion video recording mode at the first frame rate, a plurality of first video frames of the first video to generate an encode batch comprising the plurality of first video frames;
   submitting, via a central processor, the encode batch comprising the plurality of first video frames for encoding to a graphics processor;
   encoding, during a continuous active state of the graphics processor, the encode batch to generate a first encoded bitstream, wherein the graphics processor does not enter a low power state during the continuous active state;
   capturing, via the camera in the standard video recording mode, second video at the second frame rate;
   buffering, via the memory and in response to the second video being captured in the standard video recording mode at the second frame rate, a plurality of second video frames of the second video;
   submitting, via the central processor, the second video frames for encoding to the graphics processor; and
   encoding, via the graphics processor, the second video frames to generate a second encoded bitstream, wherein the graphics processor enters the low power state between encode of each of the second video frames.

2. The method of claim 1, further comprising:
   buffering, at least partially during the encoding of the encode batch, a plurality of third video frames of the first video to generate a second encode batch comprising the plurality of third video frames.

3. The method of claim 2, further comprising:
   entering the graphics processor into the low power state upon completion of the encode batch; and
   encoding, during a second continuous active state of the graphics processor, the second encode batch to generate a third bitstream.

4. The method of claim 1, further comprising:
   entering the slow motion video recording mode based on a requested frame capture rate comprising the first frame rate, wherein the first frame rate is not less than 120 fps.

5. The method of claim 1, further comprising:
   entering the slow motion video recording mode based on a slow motion video recording request signal.

6. The method of claim 1, further comprising:
   setting a batch size associated with the encode batch, wherein the batch size determines a number of video frames in the plurality of video frames.

7. The method of claim 1, further comprising:
   implementing a main thread to provide the buffering of the plurality of first video frames to generate the encode batch comprising the plurality of first video frames; and
   implementing a worker thread to provide the submitting of the encode batch comprising the plurality of first video frames for encoding and to monitor the encoding of the encode batch.

8. The method of claim 7, wherein the main thread is to add each of the first video frames to a buffer to generate the encode batch and to increase a buffer counter based on adding each of the first video frames.

9. The method of claim 8, wherein the worker thread is to fetch the first video frames from the buffer based on the buffer counter reaching a batch depth associated with the encode batch and provide the first video frames to the graphics processor for encoding.

10. The method of claim 9, wherein the worker thread is further to, upon a particular frame of the first video frames completing encoding, release a buffer portion of the buffer associated with the particular frame.

11. The method of claim 1, wherein submitting the encode batch comprises sequentially submitting the plurality of first video frames of the encode batch.

12. The method of claim 1, wherein encoding the encode batch comprises encoding two or more of the plurality of first video frames in parallel.

13. A system for adaptively batching encode tasks for slow motion video recording comprising:
    a memory comprising a buffer for storing video frames;
    a camera to:

capture, in a slow motion video record mode, first video at a first frame rate of not less than twice a second frame rate of a standard video record mode; and capturing, in the standard video record mode, second video at the second frame rate;

a central processor coupled to the memory, the central processor to:

store to the buffer, in response to the first video being captured in the slow motion video record mode, a plurality of first video frames of the first video to generate an encode batch comprising the plurality of first video frames; and store to the buffer, in response to the second video being captured in the standard motion video record mode, a plurality of second video frames of the second video; and a graphics processor to:

encode, during a continuous active state of the graphics processor, the encode batch to generate an encoded bitstream, wherein the graphics processor does not enter a low power state during the continuous active state; and encode the second video frames to generate a second encoded bitstream, wherein the graphics processor enters the low power state between encode of each of the second video frames.

14. The system of claim 13, wherein the central processor is further to store to the buffer, at least partially during the encode of the encode batch, a plurality of third video frames of the first video to generate a second encode batch comprising the plurality of third video frames.

15. The system of claim 13, wherein the central processor is further to enter the slow motion video record mode based on a requested frame capture rate comprising the first frame rate, wherein the first frame rate is not less than 120 fps.

16. The system of claim 13, wherein the central processor is further to implement a main thread to add the first video frames to the buffer to generate the encode batch comprising the plurality of first video frames and to increase a buffer counter based on an addition of each of the first video frames, and wherein the central processor is further to implement a worker thread to submit the encode batch comprising the plurality of first video frames to the graphics processor, to monitor the encode of the encode batch, and to fetch the first video frames from the buffer based on the buffer counter reaching a batch depth associated with the encode batch.

17. The system of claim 13, wherein the graphics processor is to encode two or more of the plurality of video frames of the encode batch in parallel.

18. The system of claim 13, wherein the central processor and the graphics processor comprise a system on a chip.

19. At least one non-transitory machine readable medium comprising a plurality of instructions that, in response to being executed on a computing device, cause the computing device to adaptively batch encode tasks for slow motion video recording by:

capturing, in a slow motion video recording mode, first video at a first frame rate of not less than twice a second frame rate of a standard video recording mode;

buffering, in response to the first video being captured in the slow motion video recording mode at the first frame rate, a plurality of first video frames of the first video to generate an encode batch comprising the plurality of first video frames;

submitting the encode batch comprising the plurality of first video frames for encoding to a graphics processor;

encoding, during a continuous active state of the graphics processor, the encode batch to generate a first encoded bitstream, wherein the graphics processor does not enter a low power state during the continuous active state;

capturing, in the standard video recording mode, second video at the second frame rate;

buffering, in response to the second video being captured in the standard video recording mode at the second frame rate, a plurality of second video frames of the second video;

submitting the second video frames for encoding to the graphics processor; and encoding, via the graphics processor, the second video frames to generate a second encoded bitstream, wherein the graphics processor enters the low power state between encode of each of the second video frames.

20. The non-transitory machine readable medium of claim 19, further comprising instructions that, in response to being executed on the computing device, cause the computing device to adaptively batch encode tasks for slow motion video recording by:

buffering, at least partially during the encoding of the encode batch, a plurality of third video frames of the first video to generate a second encode batch comprising the plurality of third video frames;

entering the graphics processor into a the low power state upon completion of the encode batch; and encoding, during a second continuous active state of the graphics processor, the second encode batch to generate a third bitstream.

21. The non-transitory machine readable medium of claim 19, further comprising instructions that, in response to being executed on the computing device, cause the computing device to adaptively batch encode tasks for slow motion video recording by:

implementing a main thread to provide the buffering of the plurality of first video frames to generate the encode batch comprising the plurality of first video frames; and implementing a worker thread to provide the submitting of the encode batch comprising the plurality of first video frames for encoding and to monitor the encoding of the encode batch.

22. The non-transitory machine readable medium of claim 21, wherein the main thread is to add each of the first video frames to a buffer to generate the encode batch and to increase a buffer counter based on adding each of the first video frames and wherein the worker thread is to fetch the first video frames from the buffer based on the buffer counter reaching a batch depth associated with the encode batch and provide the first video frames to the graphics processor for encoding.

* * * * *